(12) United States Patent
Yeung et al.

(10) Patent No.: US 9,959,839 B2
(45) Date of Patent: May 1, 2018

(54) PREDICTIVE SCREEN DISPLAY METHOD AND APPARATUS (71) Applicant: Intel Corporation, Santa Clara, CA (US)

(72) Inventors: Fai Yeung, Palo Alto, CA (US); Fu Zhou, San Jose, CA (US); Anna-Marie Mansour, San Francisco, CA (US); Nicholas M. Khosravy, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 14/749,105

(22) Filed: Jun. 24, 2015

(65) Prior Publication Data
US 2016/0379599 A1  Dec. 29, 2016

(51) Int. Cl.
*G06F 13/14* (2006.01)
*G09G 5/14* (2006.01)
*G09G 5/00* (2006.01)
*G09G 5/397* (2006.01)
*G09G 5/12* (2006.01)
*G06F 3/14* (2006.01)
*G06F 3/147* (2006.01)
*G06F 3/03* (2006.01)

(52) U.S. Cl.
CPC ............ *G09G 5/14* (2013.01); *G06F 3/03* (2013.01); *G06F 3/14* (2013.01); *G06F 3/147* (2013.01); *G09G 5/006* (2013.01); *G09G 5/12* (2013.01); *G09G 5/397* (2013.01); *G09G 2360/121* (2013.01); *G09G 2370/16* (2013.01); *G09G 2370/22* (2013.01); *G09G 2380/02* (2013.01)

(58) Field of Classification Search
None
See application file for complete search history.

(56) References Cited

U.S. PATENT DOCUMENTS

| | | | |
|---|---|---|---|
| 2005/0104886 A1* | 5/2005 | Rao | G06F 17/30905 345/473 |
| 2008/0172406 A1* | 7/2008 | Takeda | G09G 5/14 |
| 2010/0115461 A1* | 5/2010 | Onda | G09G 5/14 715/790 |
| 2013/0222402 A1* | 8/2013 | Peterson | G06F 9/52 345/520 |
| 2014/0028688 A1* | 1/2014 | Houjou | G09G 5/006 345/520 |
| 2014/0047379 A1* | 2/2014 | Urawaki | G09G 5/14 715/789 |

* cited by examiner

*Primary Examiner* — Martin Mushambo
(74) *Attorney, Agent, or Firm* — Schwabe, Williamson & Wyatt, P.C.

(57) ABSTRACT

Apparatuses, methods and storage media associated with display of visual assets on a device are described. Specifically, the device may include a display screen. The device may further include a visual asset scheduler. The visual asset scheduler may include a screen predictor, a queue, and a visual asset loader. Other embodiments may be described and/or claimed.

20 Claims, 6 Drawing Sheets

Non-transitory computer-readable storage medium 602

Programming Instructions 604
Configured to cause a device, in response to execution of the programming instructions, to practice (aspects of) embodiments of processes of or associated with Table 1 and/or Figure 4.

Figure 6

PREDICTIVE SCREEN DISPLAY METHOD AND APPARATUS

TECHNICAL FIELD

The present disclosure relates to the field of graphical user interfaces, and particularly to mobile device user interfaces with predictive screen display.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

A wearable device such as a smart watch and/or smart bracelet may be associated with or supported by a single mobile application, that is, an application that is run on a mobile device. Specifically, in the fashion accessories industry, device makers may desire to support different brands of products, and each brand may target a specific customer segment and/or deliver unique brand marketing messaging to users of the wearable device and/or mobile application. When a wearable device of a specific brand is connected with a mobile device running the mobile application, it may be desirable for the mobile application to deliver a unique look-and-feel and/or brand-specific features to the user of the mobile device.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Apparatuses, methods and storage media associated with mobile device user interfaces are disclosed herein. Generally, embodiments may relate to dynamic user interfaces. Specifically, embodiments may address challenges inherent to an architecture that supports dynamic user interfacing.

One such challenge may relate to demand and/or latency. Specifically, the mobile application running on the mobile device may not be aware of which visual asset to display on a display screen of the mobile device until the mobile device is paired with a wearable device. Therefore, embodiments may relate to a resource management system that may manage resources of the mobile device dynamically. Additionally or alternatively, embodiments may free up resources when they are not needed. As used herein, a visual asset associated with a wearable device may indicate that the visual asset is a graphic or content shown on the mobile device that is associated with the wearable device, a brand of the wearable device, a look-and-feel of the wearable device, or some other aspect of the wearable device and/or manufacturer of the wearable device.

A second such challenge may relate to latency in screen transition caused by visual assets not being immediately available when they are to be presented on a display screen. Embodiments herein may relate to an algorithm to load visual assets predictively, and then cache those visual assets to minimize latency in screen transition.

A third such challenge may relate to the refreshing of brand-specific visual assets. Specifically, brand owners may not want users to see "stale" user interfaces and/or content associated with their wearable devices. Embodiments herein may relate to a smart presentation engine that decides when and what visual elements are to be refreshed. This smart presentation engine may allow brand owners to customize their user experience and provide a platform for the brand owners to deliver branded messages through refreshed visual assets during a marketing campaign.

Generally, legacy solutions have allowed fashion accessories makers/owners of branded content to deliver only a single mobile application for each brand. Therefore, users that own multiple wearable devices would be required to use multiple applications. This approach could become costly for makers to design, implement, and maintain a mobile application product that was specific to each brand. Alternatively, fashion accessories makers/owners of brand content may produce a mobile application that is appropriate for multiple wearable devices, but the content of that mobile application may be generic or unfocused, and not produce a high-quality user experience In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
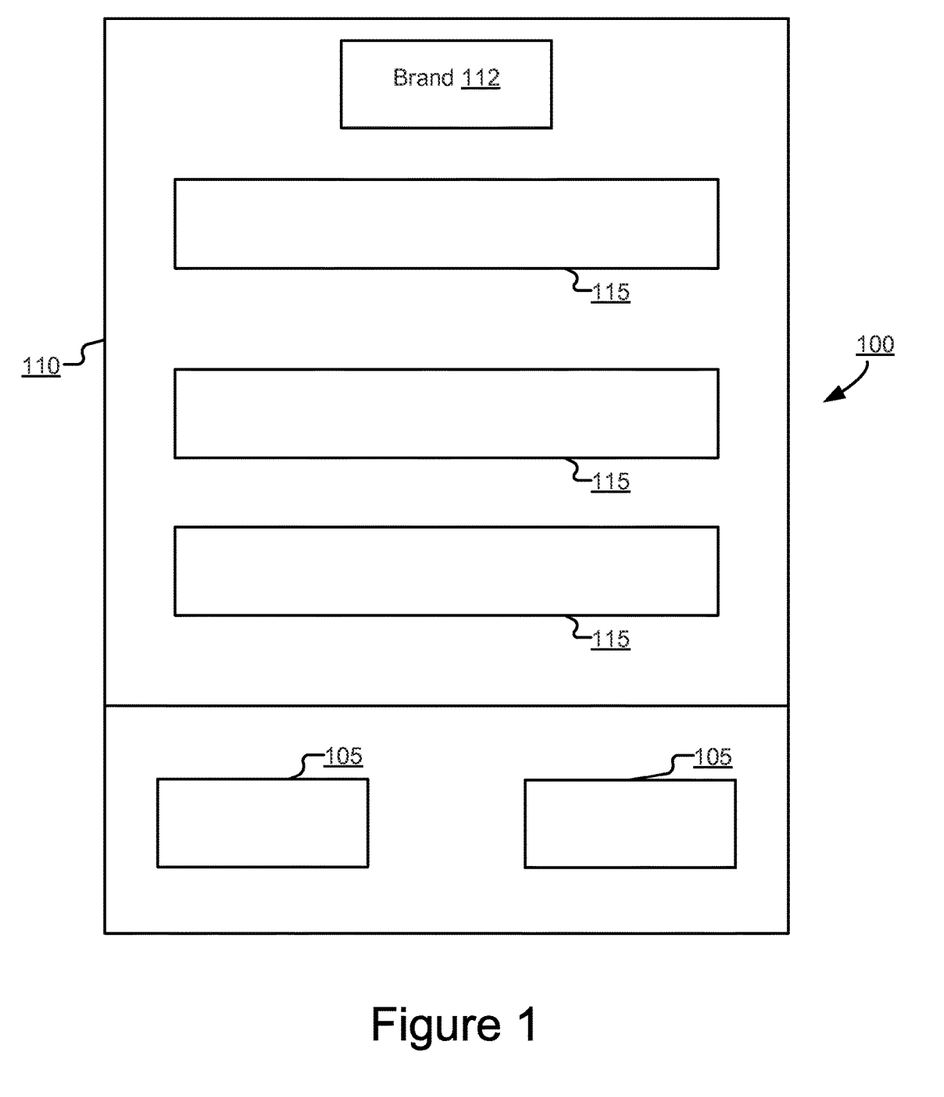
FIG. 1 illustrates a high-level schematic view of a graphical interface of a mobile application on a mobile device, in accordance with various embodiments.

FIG. 1 illustrates a high-level schematic view of a graphical interface of a mobile application on a mobile device 100. The mobile device may be, for example, a smartphone, a personal digital assistant (PDA), a tablet, a portable computer, and/or a smart watch. In embodiments, the mobile device 100 may include a display screen 110 configured to display or present one or more visual assets. The one or more visual assets may be related to a brand 112 associated with a wearable device and/or a manufacturer of the wearable device. The display screen 110 may be configured to display one or more visual assets 115 on which content can be presented such as information related to an associated wearable device, a manufacturer of the wearable device, a brand associated with the wearable device, an ad supported by a user of the wearable device, or other visual content that may be associated with the wearable device, a brand of the wearable device, and/or a manufacturer of the wearable device. The mobile device 100 may further include a portion beneath the display screen 110 that may display one or more additional visual assets 105. In some embodiments the visual assets 105 may be part of the image presented by the display screen 110, or in other embodiments they may be separate from the display screen 110 as shown in FIG. 1.

Figure 2:
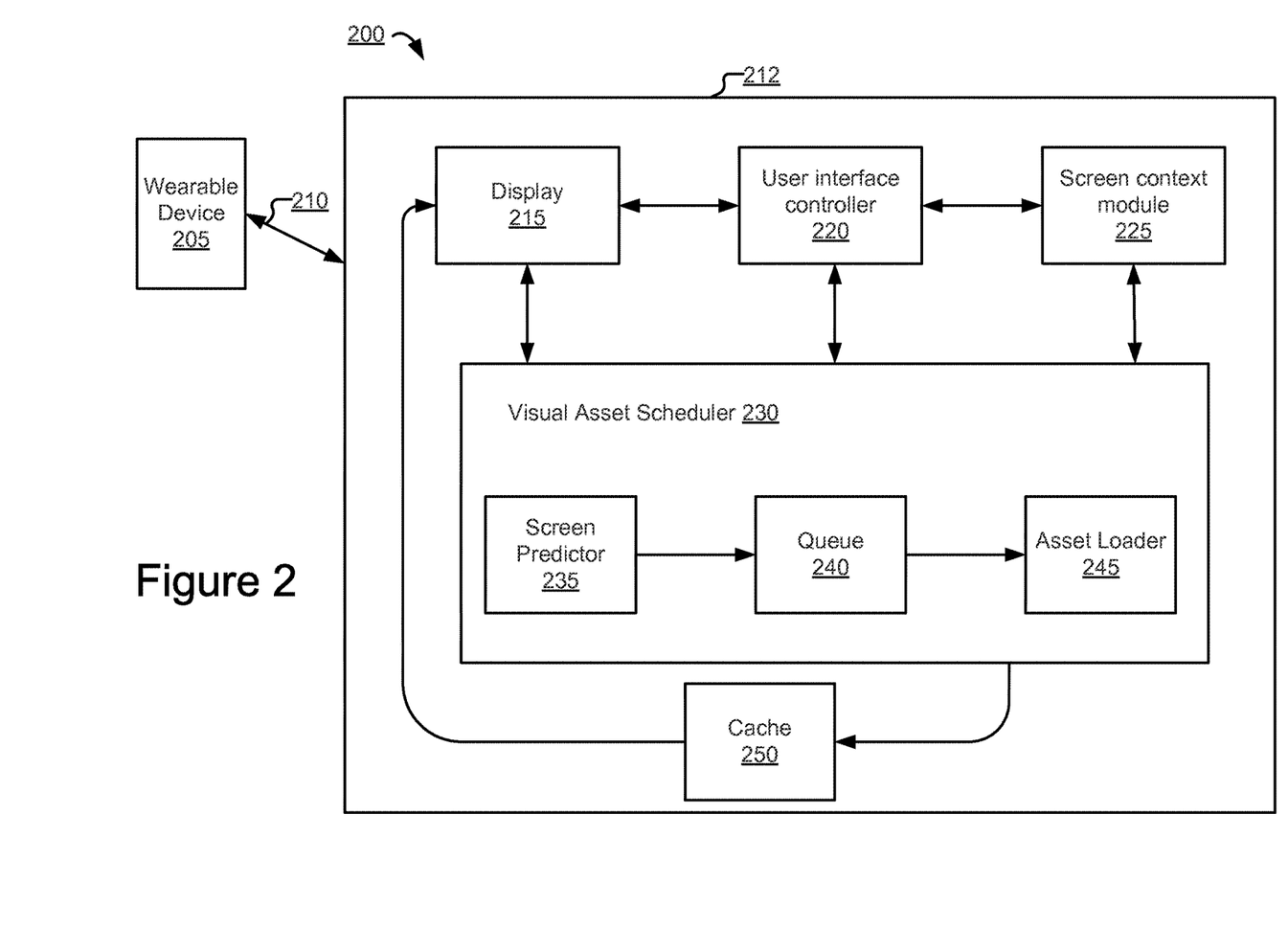
FIG. 2 illustrates an example system that includes a mobile device and a wearable device, in accordance with various embodiments.

FIG. 2 depicts an example system 200 that includes a mobile device 212, which may be similar to mobile device 100, and a wearable device 205 that may be a smart watch, smart bracelet, or some other wearable device as described above. In embodiments, the wearable device 205 may be communicatively connected with the mobile device 212 via link 210. In some embodiments link 210 may be a wireless link such as a Bluetooth low energy (BLE) link, a Bluetooth link, an Institute of Electrical and Electronic Engineers (IEEE) 802.11 link (e.g., WiFi), a cellular link or some other type of wireless link. In other embodiments, link 210 may be a wired link such as a universal serial bus (USB) link, an Ethernet link, a Thunderbolt link, or some other type of wired link.

The mobile device 212 may include a display screen 215 that may be similar to display screen 110 of FIG. 1. In some embodiments the display screen may be or include a light emitting diode (LED) display screen, an organic LED (OLED) display screen, a liquid crystal display (LCD) or some other type of display screen.

In embodiments, the mobile device 212 may further include a user interface controller 220 communicatively coupled with the display screen 215. The user interface controller 220 may be configured to record a user's visits to screens displayed or presented by the display screen 215. As used herein, a "screen" may refer to a configuration of one or more visual assets that are to be presented to a user of the mobile device 212 via display screen 215. For example, if a user of the mobile device 212 is shown a first screen on display screen 215, and then navigates to a second screen, the user interface controller 220 may identify that the user selected to navigate from the first screen to the second screen. As used herein, the first screen may be referred to as a "parent" screen, and the second screen may be referred to as a "child" screen. Generally, a child screen may be a screen that is navigated to, either directly or indirectly, by a parent screen as described in further detail below.

The user interface controller 220 may be communicatively coupled with a screen context module 225. The screen context module 225 may be configured to store the historical information recorded by the user interface controller 220. For example, the selections of a user of the mobile device 212 may be stored by the screen context module 225 for a time period such as 30 days, or some other time period. In embodiments the screen context module 225 may be configured to only store the information of a single user of the mobile device 212. Additionally or alternatively, the screen context module 225 may be configured to store information of multiple users of the mobile device 212. Additionally or alternatively, the screen context module 225 may be configured to store information related to multiple users of multiple mobile devices. For example, the screen context module 225 may be configured to receive information related to screen navigation from a central server related to a wearable device and/or mobile device.

Figure 3:
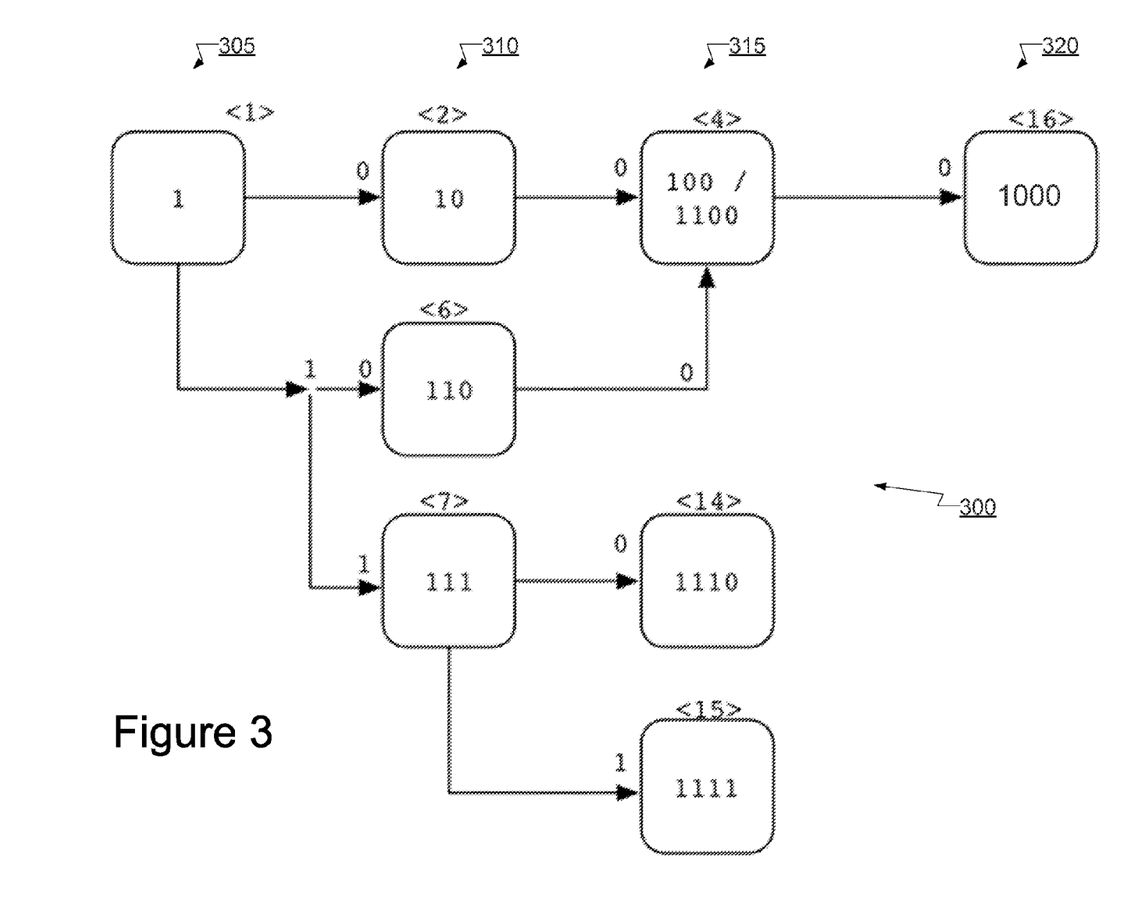
FIG. 3 illustrates an example of a screen priority binary tree, in accordance with various embodiments.

The screen context module 225 may use the historical information to generate a screen priority binary tree (SPBT) 300. An example of an SPBT 300 is depicted in FIG. 3. Each of the entries in the SPBT 300 may represent a relative priority of different screens that may be displayed by display screen 215. Generally, the SPBT 300 may be a logical description of the historical data, and specifically a logical relationship of different priorities between entries of parent and child screens. The binary values of the entries of the SPBT 300 may represent the priority values of those entries, and the base-10 values of the entries may represent a base-10 value of the binary priority value and serve as a screen identifier. For ease of reference herein, various entries will be referred to by their screen identifiers, when appropriate.

As shown in FIG. 3, the top-level parent screen, which may be a first screen displayed by display screen 215 when the mobile device 212 is turned on or associated with a wearable device 205, and which may be also referred to as the "Starter Screen," may be associated with the binary priority value "1". Generally, although the priority values may represent priorities of the various entries of the SPBT 300, in embodiments the absolute values of the priority values and/or their associated base-10 values may not be indicative of the strength of their relative priorities. For example, an entry with a binary priority value of 1 (corresponding to a base-10 value of 1) may not be seven times as important as an entry with a binary priority value of 111 (corresponding to a base-10 value of 7). Rather, the priority values may only be used to identify the relative positions of the different entries in a queue order. In other words, the priority values may only be used to order the different entries in numerical order such that the entries of SPBT 300 may be ordered according to their base-10 identifier values as: <1>, <2>, <4>, <6>, <7>, <14>, <15>, <16>, as described in further detail below.

Columns in the SPBT 300 may represent different depth levels of the SPBT 300, and may list entries of all available child screens that can be navigated to from respective parent screens. As shown in the SPBT 300, entries related to child screens may inherit the binary digit(s) of priority values of entries related to parent screens, and then further include one or more additional digits to generate relative priority values for the entries associated with those child screens.

Specifically, the historical data may be analyzed by the screen context module 225, and a parent screen may be identified. Next, one or more child screens of that parent screen may be identified. The historical data may then be analyzed to identify the number of times the user selected to navigate to each of the respective child screens of the parent screen. Based on this analysis, the priority value of the entry related to the child screen that is visited most frequently may be appended with a binary value of "0", and the priority values of the entries of any remaining child screens may be appended with a binary value of "1". If priority values of entries of multiple child screens are appended with a value of "1", then the process may be repeated for each of those entries such that the priority values of each of the entries is assigned a unique number.

An illustrative example may be described with reference to SPBT 300 of FIG. 3. SPBT 300 may include columns 305, 310, 315, and 320. The respective columns may represent a different depth level of SPBT 300. So, for example, column 305 may include an entry related to a starter screen with a binary priority value of 1 and a base-10 identifier value of <1>. Column 310 may include entries with binary priority values of 10, 110, and 111, and respective base-10 identifier values of <2>, <6>, and <7>. Column 315 may include entries with binary priority values of 100/1100, 1110, and 1111, and with respective base-10 identifier values of <4>, <14>, and <15>. Column 320 may include an entry with a binary priority value of 1000 and a base-10 identifier value of <16>.

Generally, the screens associated with entries of column 305 may be considered to be a parent screen to the respective child screens associated with entries of columns 310, 315, and 320. The screens associated with entries of column 310 may be considered to be parent screens to the child screens associated with entries of columns 315 and 320 to which they have access. So, for example, screens associated with entries <2> and <6> may be considered to be parent screens to the child screen associated with entry <4>, but not to screens associated with entries <14> and <15>. The screen associated with entry <4> may be considered to be a parent screen to the screen associated with entry <16>.

As noted above, the starter screen for the SPBT 300 may be considered to be the screen associated with entry <1>. Entry <1> may be associated with the binary priority value of 1. The screen associated with entry <1> may have three child screens, respectively associated with entries <2>, <6>, and <7>. The child screen associated with entry <2> may be identified, by the screen context module 225 based on the historical data, to be the screen that is visited most frequently from the screen associated with entry <1>. Therefore, the binary priority value of entry <2> may be appended with a value of "0" such that the binary priority value of entry <2> may be 10. The binary priority values of entries <6> and <7> may be appended with a binary value of "1" such that the binary priority value of entries <6> and <7> may be 11. However, two entries may not have the same priority value, so the screen context module 225 may further review the historical data and identify that the screen associated with entry <6> is more likely to be visited by a user of the mobile device 212 than the screen associated with entry <7>. Therefore, the binary priority value of entry <6> may be appended with a binary value of "0" and the binary priority value of entry <7> may be appended with a binary value of "1" such that they have binary priority values of 110 and 111, respectively.

In some embodiments, a screen such as the screen associated with entry <4> may be directly accessible from two screens such as the screens associated with entries <2> and <6>. In some embodiments the binary priority value of the entry may be associated with two separate binary values based on the binary priority values of its parent entries. So, for example, if entry <2> has a binary priority value of 10, and entry <6> has a binary priority value of 110, entry <4> may be associated with both values 100 (e.g., binary value 10 appended with an additional "0") and 1100 (e.g., binary value 110 appended with an additional "0"). However, as shown in FIG. 3, the base-10 identifier value of the entry may be considered to be the base-10 value of the lowest binary priority value. Therefore, the base-10 identifier value associated with entry <4> may have the base-10 value of 4 rather than the base-10 value of 12 (i.e., the binary value 1100). In other embodiments, the base-10 identifier value of the entry may take on the base-10 value of the highest binary value, or it may take on some other value if it is associated with two or more different binary values.

It will be understood that SPBT 300 is one illustrative example of an SPBT, and in other embodiments different SPBTs with different parent/child relationships and different depth levels may be used. For example, an SPBT may have multiple starter screens. An SPBT may have more or fewer screens than depicted in FIG. 3. An SPBT may have more or fewer columns/depth levels. In some embodiments, the priority values and/or identifier values of the various entries of the SPBT may use a different numerical system such as octal, hexadecimal, etc.

The display screen 215, the user interface controller 220, and/or the screen context module 225 may be further communicatively coupled with a visual asset scheduler 230 as depicted in FIG. 2. In embodiments, the visual asset scheduler 230 may include a screen predictor 235, a queue 240, and an asset loader 245.

The screen predictor 235 may be configured to identify, based on the SPBT 300, an order in which the screens associated with the entries of the SPBT 300 are likely to be displayed, and push entries into the queue 240 according to that order. Specifically, the screen predictor 235 may first identify an entry of the SPBT with a priority value $\overline{A}=\overline{a_{n-1}...a_1a_0}$. As used herein, $a_i$ may refer to a binary value that is either 0 or 1, and $\overline{A}$ may refer to the priority value of an entry being requested by a user of the mobile device 212, but is not yet cached. For example, for entry <14>, $\overline{A}$ may be equal to "1110." Specifically, $\overline{A}$ may have n values where n is equal to 4. $a_0$ may be equal to the binary value 0. $a_1$ may be equal to the binary value 1. $a_2$ may be equal to the binary value 0. $a_3$ may be equal to the binary value 1.

Based on this identification, the screen predictor 235 may push entry $\overline{A}$ into queue 240, a process which may be referred to as "queuing" or "en-queuing" the entry. Next, the screen predictor 235 may then examine the first item in the queue 240, for example, entry $\overline{A}$, and add two further entries to the queue. Specifically, the screen predictor 235 may en-queue entries $\overline{A0}=\overline{a_{n-1}...a_1a_00}$ and $\overline{A1}=\overline{a_{n-1}...a_1a_01}$. By adding entries $\overline{A0}$ and $\overline{A1}$ to the queue 240, the screen predictor 235 may ensure that the entries with the highest probability of being visited from the screen associated with entry $\overline{A}$ may be loaded, and then screens with the next highest probability are loaded, and so on. This process may be repeated according to different implementations. For example, in some embodiments the queue may only hold entries $\overline{A}$, $\overline{A0}$, and $\overline{A1}$. In other embodiments, the queue 240 may be able to hold only two entries, or it may be able to hold multiple entries (e.g., all of the entries of SPBT 300).

In some cases, it may be possible that the screen predictor 235 may en-queue an entry that doesn't exist (e.g. entries with a priority value of 11 or 1100 in SPBT 300). If $\overline{A0}$ doesn't exist, this may indicate that $\overline{A}$ is an entry associated with a "leaf" screen without any child screens. In this case, the screen predictor 235 may stop processing entry $\overline{A0}$ and move on to entry $\overline{A1}$.

If $\overline{A1}$ doesn't exist, this may indicate that the screen associated with entry $\overline{A}$ has more than two child screens. In this case, the screen predictor 235 may en-queue $\overline{A10}$ and $\overline{A11}$ into the queue 240 at a lower priority than the $\overline{A0}$ branch. This en-queuing with a lower priority may be achieved by associating entry $\overline{A}$ with one or more "flag" bits in the queue 240 to delay the en-queuing of this branch.

In some embodiments, each entry in the queue may be associated with two separate flag bits. The first flag bit may be an existence flag that indicates whether the queued entry exists. For example, the existence flag may be set to a value of "1" for an entry of SPBT 300 with a priority value of 1, and set to "0" for an entry of SPBT 300 with a priority value of 11, because an entry with a priority value of 11 may not exist in SPBT 300. A second flag bit may be a reinsertion flag that may indicate, for an entry where the value of the existence flag is 0, that the entry has a child screen. For example, even though an entry with a priority value of 11 may not exist, entries <6> and <7> may exist, and have respective priority values of 110 and 111. Therefore, the queued entry with the priority value of 11 may a reinsertion flag set to "0" to indicate that the entry with the priority value of 11 does not exist but entries with priority values of 110 and 111 do exist. Generally, the existence flag may be set when child entries of a parent entry currently being analyzed by the screen predictor 235 are pushed into queue 240. The reinsertion flag may be set when the entry being analyzed by the screen predictor 235 is pushed into the queue 240.

Table 1, below, demonstrates an example queueing flow that may be performed by the screen predictor 235 when pushing entries from SPBT 300 into the queue 240. Specifically, Table 1 may show how various entries are pushed into the queue 240 and analyzed, and how the reinsertion flag and/or existence flag may be set in each instance.

TABLE 1

| Current entry of SPBT 300 identified as $\overline{A}$ {reinsertion flag, priority value, existence flag} | Push entries $\overline{A0}$ and $\overline{A1}$ into queue 240 {reinsertion flag, priority value, existence flag} | Entries in queue 240 after queueing operation {reinsertion flag, priority value, existence flag} |
|---|---|---|
| {0, 1, 1} | {0, 10, 1}, {0, 11, 0} | {0, 1, 1} {0, 1, 1}, {0, 10, 1}, {0, 11, 0} |
| {0, 10, 1} | {0, 100, 1}, {0, 101, 0} | {0, 1, 1}, {0, 10, 1}, {0, 11, 0}, {0, 100, 1}, {0, 101, 0} |
| {0, 11, 0} | {1, 11, 0} | {0, 1, 1}, {0, 10, 1}, {0, 11, 0}, {0, 100, 1}, {0, 101, 0}, {1, 11, 0} |
| {0, 100, 1} | {0, 1000, 1}, {0, 1001, 0} | {0, 1, 1}, {0, 10, 1}, {0, 11, 0}, {0, 100, 1}, {0, 101, 0}, {1, 11, 0}, {0, 1000, 1}, {0, 1001, 0} |
| {0, 101, 0} | No entries pushed into queue 240 | {0, 1, 1}, {0, 10, 1}, {0, 11, 0}, {0, 100, 1}, {0, 101, 0}, {1, 11, 0}, {0, 1000, 0}, {0, 1001, 0} |
| {1, 11, 0} | {0, 110, 1}, {0, 111, 1} | {0, 1, 1}, {0, 10, 1}, {0, 11, 0}, {0, 100, 1}, {0, 101, 0}, {1, 11, 0}, {0, 1000, 0}, {0, 1001, 0}, {0, 110, 1}, {0, 111, 1} |
| {0, 1000, 0} | No entries pushed into queue 240 | {0, 1, 1}, {0, 10, 1}, {0, 11, 0}, {0, 100, 1}, {0, 101, 0}, {1, 11, 0}, {0, 1000, 0}, {0, 1001, 0}, {0, 110, 1}, {0, 111, 1} |
| {0, 1001, 0} | No entries pushed into queue 240 | {0, 1, 1}, {0, 10, 1}, {0, 11, 0}, {0, 100, 1}, {0, 101, 0}, {1, 11, 0}, {0, 1000, 0}, {0, 1001, 0}, {0, 110, 1}, {0, 111, 1} |
| {0, 110, 1} | {0, 1100, 0}, {0, 1101, 0} | {0, 1, 1}, {0, 10, 1}, {0, 11, 0}, {0, 100, 1}, {0, 101, 0}, {1, 11, 0}, {0, 1000, 0}, {0, 1001, 0}, {0, 110, 1}, {0, 111, 1}, {0, 1100, 0}, {0, 1101, 0} |
| {0, 111, 1} | {0, 1110, 1}, {0, 1111, 1} | {0, 1, 1}, {0, 10, 1}, {0, 11, 0}, {0, 100, 1}, {0, 101, 0}, {1, 11, 0}, {0, 1000, 0}, {0, 1001, 0}, {0, 110, 1}, {0, 111, 1}, {0, 1100, 0}, {0, 1101, 0}, {0, 1110, 1}, {0, 1111, 1} |
| {0, 1110, 1} | No entries pushed into queue 240 | {0, 1, 1}, {0, 10, 1}, {0, 11, 0}, {0, 100, 1}, {0, 101, 0}, {1, 11, 0}, {0, 1000, 0}, {0, 1001, 0}, {0, 110, 1}, {0, 111, 1}, {0, 1100, 0}, {0, 1101, 0}, {0, 1110, 1}, {0, 1111, 1} |
| {0, 1111, 1} no child | No entries pushed into queue 240 | {0, 1, 1}, {0, 10, 1}, {0, 11, 0}, {0, 100, 1}, {0, 101, 0}, {1, 11, 0}, {0, 1000, 0}, {0, 1001, 0}, {0, 110, 1}, {0, 111, 1}, {0, 1100, 0}, {0, 1101, 0}, {0, 1110, 1}, {0, 1111, 1} |

As can be generally seen from the process flow above, the screen predictor 235 may start with an entry in the SPBT 300 related to the starter screen, for example, <1>. Entry <1> may be pushed into queue 240, and then the screen predictor 235 may analyze <1> to identify whether entries related to child screens exist. Specifically, the screen predictor 235 may push entries with priority values of 10 and 11 into queue 240. However, as can be seen in SPBT 300, an entry with a priority value of 11 may not exist in SPBT 300, and so it may be en-queued with an existence flag with a value of 0. Because the entry with priority value of 10 is next in the queue, that entry may be analyzed next, and the screen predictor 235 may attempt to find entries with priority values of 100 and 101, respectively. As can be seen in SPBT 300, an entry, <4>, with a priority value of 100 may exist, while an entry with a priority value of 101 may not exist. Therefore, the existence value of the entry with the priority value of 100 may be set to 1, and the existence value of the entry with the priority value of 101 may be set to 0. This process may be repeated until the entire SPBT 300 is traversed, or some other operation or criteria signifies that the process should end.

Some special cases may be seen in Table 1, above. For example, the entry with the priority value of 11 may not exist, and therefore it may be en-queued with an existence flag of 0 and an initial reinsertion flag with a value of 0. However, when the screen predictor 235 arrives at that entry, it may identify that although the entry with a priority value of 11 may not exist, child screens of that entry do exist. Therefore, the entry with the priority value of 11 may be appended at the end of the queue 240 with a reinsertion flag value of 1, as shown in Table 1. That entry may then be re-evaluated later and the child entries of the entry with the priority value of 11, that is, entries <6> and <7>, may be en-queued in queue 240.

Additionally, in some cases an entry may not have child screens, for example, the entries with the priority values of 101, 1000, 1001, 1110, and 1111. In this case, no entries may be appended to the queue 240, as shown in Table 1.

It will be understood that Table 1 is intended merely as one description, and in other embodiments different flags may have different values, or the order of traversal may be different. For example, in some embodiments the flag values may be reversed so that an existence flag value of 1 indicates that the requested entry does not exist, and a value of 0 indicates that the requested entry does exist. The re-insertion flag value may be similarly reversed. In some embodiments, additional flags may be included, or the re-insertion and existence flags may be combined. In some cases, the flags may have more than 2 states, and therefore may be represented by more than one binary bit, or a representation according to a different numerical system (octal, hexadecimal, base-10, etc.).

The asset loader 245 may be configured to fetch entries from the queue 240 according to the order in which they were en-queued by the screen predictor 235. The asset loader 245 may then load and/or cache one or more visual assets of the screens associated with those entries. Specifically, the asset loader 245 may store the visual assets in a cache 250 of the mobile device 212, which may be coupled with display screen 215. In some embodiments, the asset loader 245 may be able to use multiple threads to fetch the entries from the queue 240. For example, in some embodiments the asset loader 245 may have multiple threads, so that multiple entries may be processed at the same time. The number of threads of the asset loader 245 may be three threads, while other embodiments may use more or fewer threads.

Generally, the asset loader 245 may load the first entry in the queue 240. Using the example of the en-queued entries depicted in Table 1, the asset loader 245 may first load and begin processing the entry with the priority value of 1. The asset loader 245 may then load and begin processing the entry with the priority value of 10, then 11, then 100, then 101, etc. In embodiments, the asset loader 245 may identify, based on the existence flag or based on some other criteria, that an entry such as the entry associated with priority values 11 or 101 may not exist. In this case, the asset loader 245 may discard that entry and load the next entry in the queue. Once the visual assets of a screen associated with an entry are loaded and cached by the asset loader 245, the asset loader 245 may then move to the next entry in the queue 240. The asset loader 245 may repeat this process until all entries of the queue 240 are traversed, or the process is interrupted.

Figure 4:
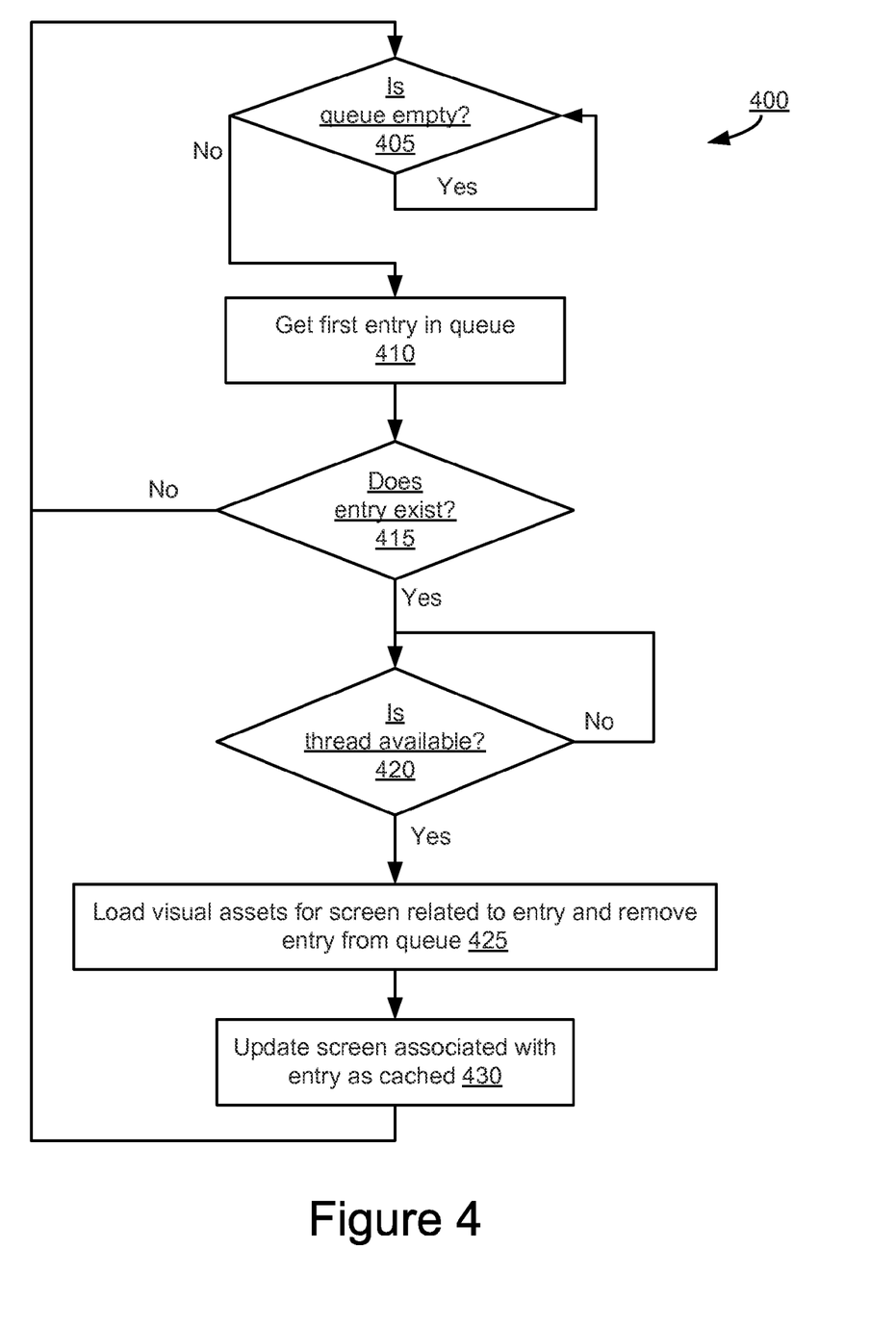
FIG. 4 illustrates an example process that may be performed by a mobile device, in accordance with various embodiments.

FIG. 4 depicts an example process 400 that may be performed by the asset loader 245. Initially, the asset loader 245 may identify at 405 whether the queue 240 is empty. If the queue 240 is empty, then the process 400 may cycle until the queue 240 is not empty. When the asset loader 245 identifies at 405 that the queue 240 is not empty, the asset loader 245 may retrieve the first entry in the queue 240 at 410. For example, initially the asset loader 245 may retrieve the entry with the priority value of 1.

The asset loader 245 may identify at 415 whether the entry exists, for example, based on the value of the existence flag associated with that entry. If the entry does not exist, then the asset loader 245 may return to element 405 and identify whether the queue 240 is empty. However, if the entry does exist, then the asset loader 245 may identify whether a thread is available at 420. As noted above, in some cases the asset loader 245 may have multiple threads which it may use to process the entries of the queue 240. If a thread is not available, for example, if each thread of the asset loader 245 is already processing an entry of the queue 240, then the process 400 may cycle at 420 until a thread is identified as available.

Once a thread is available, the asset loader 245 may, at 425, load visual assets of a screen related to the entry, and remove that entry from the queue 240. As part of loading the visual assets at 425, the asset loader 245 may store the visual assets in cache 250, as described above.

The asset loader 245 may then identify at 430 that the visual assets of the screen associated with the entry is cached, and return to element 405. This process 400 may cycle until the queue 240 is empty, at which point the process 400 would either end or cycle at 405.

In some embodiments, because memory on mobile device 212 may be limited, the size of the queue 240 may be based on local memory space of different mobiles devices. In some embodiments, the asset loader 245 may maintain a least-recently-used (LRU) list, in which visual assets or entries that are not frequently used may be placed. Once a memory threshold of the mobile device is reached, the visual assets related to entries in the LRU list may be deleted. In some embodiments, if a visual asset is not present locally on a mobile device when it is requested by the asset loader 245, it may be fetched from an edge-based caching service that may be provided by a cloud back-end. An example of an edge-server of an edge-based caching service may be a content delivery network (CDN). The LRU and/or the CDN may be configured with a counter that may track how many times certain visual assets are accessed or fetched. Based on a threshold related to the counter, those visual assets may be refreshed. For example, the counter may be related to the last time that one of the visual assets was fetched or used, and if a certain length of time has expired or if the asset has been fetched above (or below) a certain limit, that visual asset may be refreshed so that a new and/or updated visual asset is displayed next time it is fetched.

In some embodiments a brand manager or entity associated with a brand or visual asset may want to update a given visual asset. In this case, the visual asset may be either pushed onto the phone so that it is present when a screen that uses that visual asset is loaded, or it may be present in a cloud so that it may be provided to the phone. Specifically, a brand manager or entity associated with a wearable device may designate certain visual assets as "Spotlight" visual assets. Spotlight visual assets may have rules that may be triggered when the visual assets reach a certain age, either on a mobile device 212 or in the cloud as described above. For example, Spotlight visual assets may be associated with a view count so that after a Spotlight visual asset is rendered a certain number of times, a visual asset scheduler (not shown in FIG. 2) may age out some of the visual assets and pull fresh content to replace that aged out visual asset so that a user is not presented with "stale" content. Additionally or alternatively, a brand manager may actively trigger an update of Spotlight visual assets such that fresh assets are pushed to the mobile device 212.

This refreshing mechanism of the Spotlight visual assets may result in a dynamic user experience where different parts of an application or view controller may have different thresholds for freshness. The view count and thresholds for freshness may be used to optimize the fetching of visual assets from the edge server.

Figure 5:
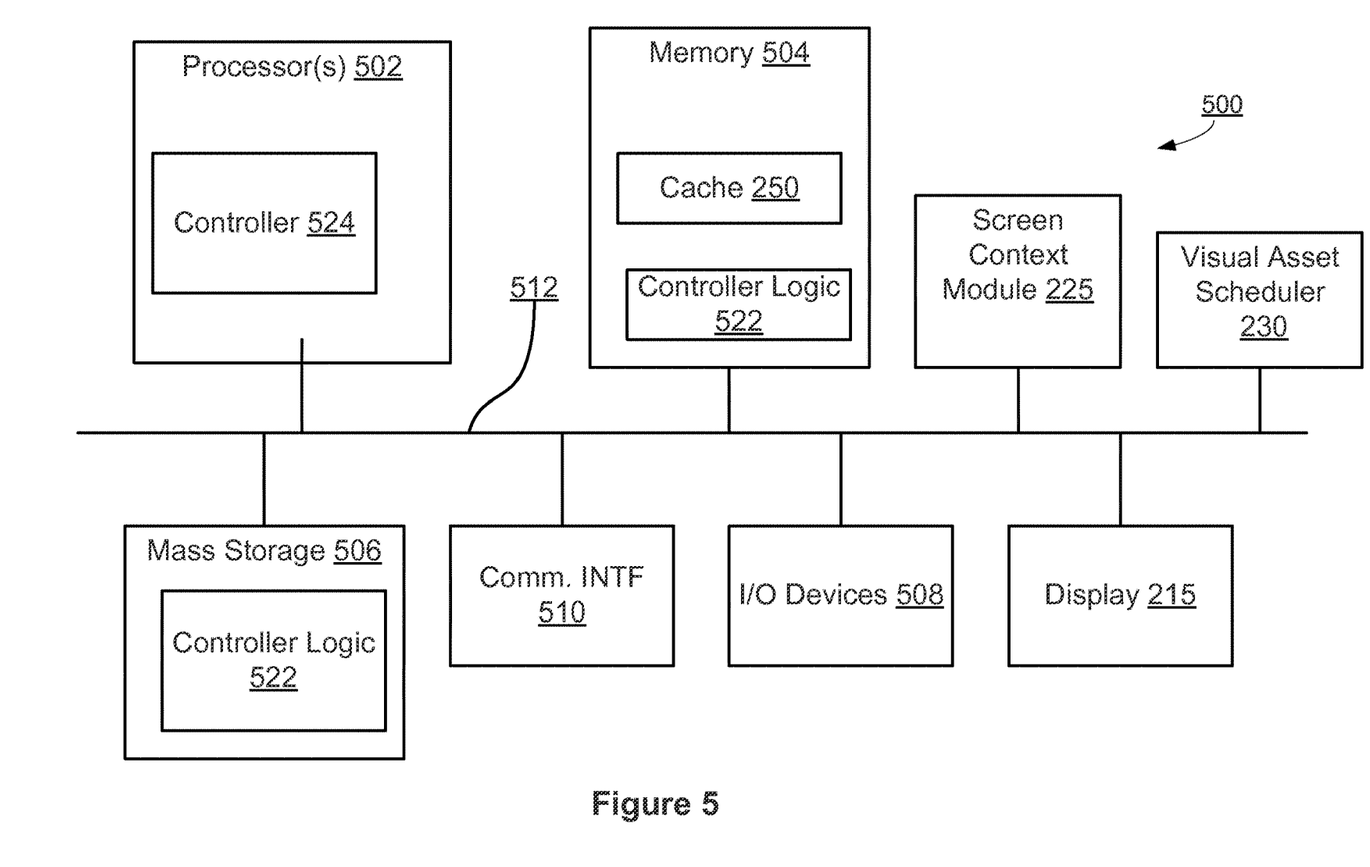
FIG. 5 illustrates an example computer system suitable for use to practice various aspects of the present disclosure, according to the disclosed embodiments.

FIG. 5 illustrates an example electronic device 500 (e.g., a computer, a server, or some other electronic device) that may be suitable to practice selected aspects of the present disclosure. As shown, electronic device 500 may include one or more processors or processor cores 502 and system memory 504. For the purpose of this application, including the claims, the terms "processor" and "processor cores" may be considered synonymous, unless the context clearly requires otherwise. Additionally, electronic device 500 may include mass storage devices 506 (such as diskette, hard drive, compact disc read-only memory (CD-ROM) and so forth), input/output (I/O) devices 508 (such as a display, keyboard, cursor control and so forth) and communication interfaces 510 (such as network interface cards, modems and so forth). The elements may be coupled to each other via system bus 512, which may represent one or more buses. In the case of multiple buses, they may be bridged by one or more bus bridges (not shown). Additionally, or alternatively, electronic device 500 may also include one or more of screen context module 225, visual asset scheduler 230, and/or display screen 215. In some embodiments, the memory 504 may be coupled with or otherwise include cache 250. In embodiments, the processor(s) 502 may be or include one or more of the controllers 524 configured to perform the operations described above with respect to FIG. 4 and/or Table 1.

Each of these elements may perform its conventional functions known in the art. In particular, in some embodiments, system memory 504 and mass storage devices 506 may be employed to store a working copy and a permanent copy of the programming instructions configured to cooperate with controllers 524 to perform the operations associated with the process of FIG. 4 and/or Table 1, earlier described, collectively referred to as controller logic 522.

The various elements may be implemented by assembler instructions supported by processor(s) 502 or high-level languages, such as, for example, C, that can be compiled into such instructions.

The number, capability and/or capacity of these elements 510-512 may vary, depending on whether electronic device 500 is used as a mobile device, like a smartphone, computing tablet, ultrabook or laptop. Otherwise, the constitutions of elements 510-512 may be known, and accordingly will not be further described.

Figure 6:
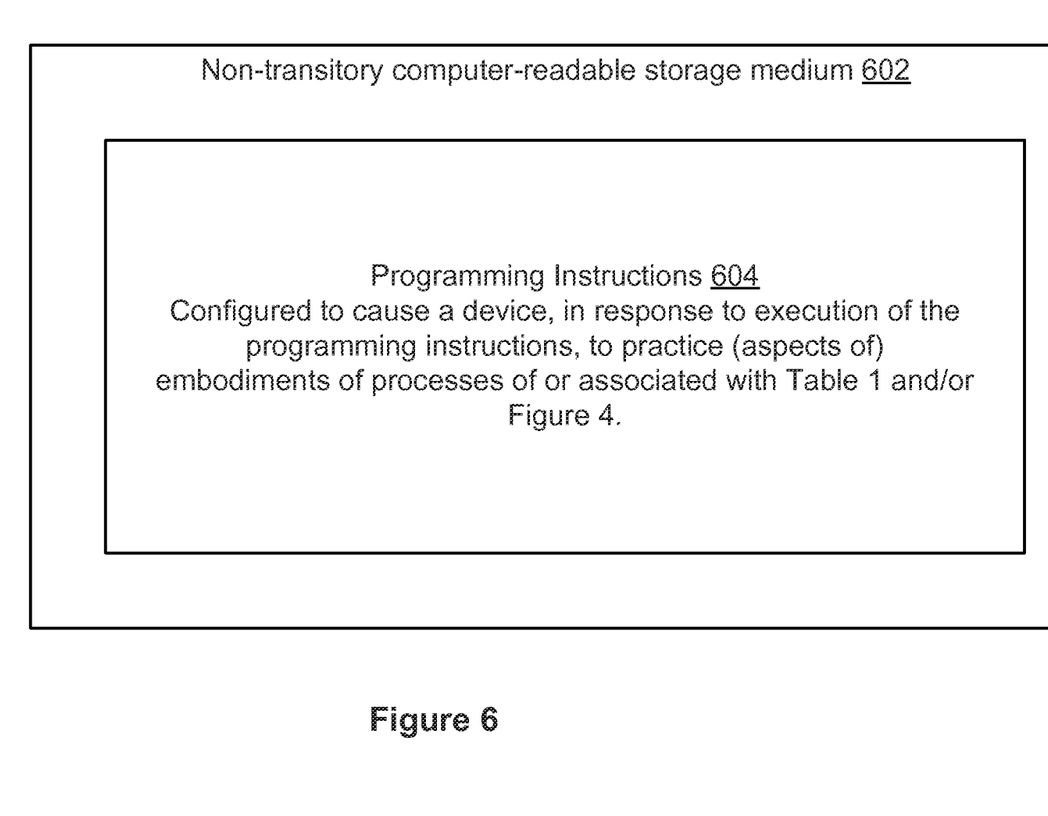
FIG. 6 illustrates a storage medium having instructions for practicing processes described with reference to FIG. 5, according to disclosed embodiments.

As will be appreciated by one skilled in the art, the present disclosure may be embodied as methods or computer program products. Accordingly, the present disclosure, in addition to being embodied in hardware or logic as earlier described, may take the form of an entire software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., electronic device 500, in response to execution of the programming instructions, to perform, e.g., various operations associated with the operations or processes of FIG. 4 and/or Table 1. In alternate embodiments, programming instructions 604 may be disposed on multiple computer-readable non-transitory storage media 602 instead. In alternate embodiments, programming instructions 604 may be disposed on computer-readable transitory storage media 602, such as signals.

Any combination of one or more computer-usable or computer-readable medium(s) may be utilized. The computer-usable or computer-readable medium may be, for example, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, radio frequency (RF), etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments may be implemented as a computer process, a computing system or an article of manufacture such as a computer program product of computer-readable media. The computer program product may be a computer storage medium readable by a computer system and encoding computer program instructions for executing a computer process.

The corresponding structures, material, acts, and equivalents of all means or steps plus function elements in the claims below are intended to include any structure, material or act for performing the function in combination with other claimed elements that are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 5, for one embodiment, at least one of processors 502, and specifically the controller 524, may be packaged together with memory having controller logic 522 (in lieu of storing on memory 504 and storage 506). For one embodiment, at least one of processors 502 may be packaged together with memory having controller logic 522 to form a System in Package (SiP). For one embodiment, at least one of processors 502 may be integrated on the same die with memory having controller logic 522. For one embodiment, at least one of processors 502 may be packaged together with memory having controller logic 522 to form a System on Chip (SoC). For at least one embodiment, the SoC may be utilized in, e.g., but not limited to, a smartphone or computing tablet.

Thus various example embodiments of the present disclosure have been described including, but not limited to:

Example 1 may include a device comprising: a display screen; and a visual asset scheduler coupled with the display screen, wherein the visual asset scheduler includes: a screen predictor to identify respective priorities of one or more screens that are to be displayed on the display screen; a queue to queue the one or more screens in an order related to the respective priorities of the one or more screens; and a visual asset loader to load, based on the order, respective visual assets associated with the one or more screens.

Example 2 may include the device of Example 1, wherein the screen predictor is to identify a priority of one of the one or more screens based at least in part on a likelihood that a user of the device will select the one of the one or more screens from a current screen that is displayed by the display screen.

Example 3 may include the device of Example 2, wherein the screen predictor is to identify the likelihood based at least in part on historical data of the one or more screens.

Example 4 may include the device of Example 2, wherein the current screen is a parent screen and the one or more screens are child screens of the parent screen.

Example 5 may include the device of any of Examples 1-4, wherein the screen predictor is to identify the respective priorities of the one or more screens based on a screen priority binary tree.

Example 6 may include the device of any of Examples 1-4, wherein the queue is to associate one of the one or more screens with a flag that indicates that the one of the one or more screens is not associated with assets.

Example 7 may include the device of any of Examples 1-4, wherein the queue is to associate one of the one or more screens with a flag that indicates that the one of the one or more screens has a child screen.

Example 8 may include the device of any of Examples 1-4, wherein the respective assets are associated with a smart watch that is in communication with the device.

Example 9 may include a method comprising: identifying, by a visual asset scheduler of a device, respective priorities of one or more child screens of a parent screen; queuing, by the visual asset scheduler, the one or more child screens in an order related to the respective priorities of the one or more child screens; and caching, by the visual asset scheduler, visual assets related to the one or more child screens according to the order.

Example 10 may include the method of Example 9, further comprising identifying, by the visual asset scheduler, the respective priorities of the one or more child screens based on a screen priority binary tree.

Example 11 may include the method of Example 9, wherein identifying comprises identifying a priority of one of the one or more child screens is based at least in part on a likelihood that a user of the device will select the one of the one or more child screens from the parent screen.

Example 12 may include the method of Example 11, wherein the likelihood is determined based at least in part on historical data related to the one or more child screens.

Example 13 may include the method of any of Examples 9-12, wherein the queuing includes associating, by the visual asset scheduler, one of the one or more child screens with a flag that indicates that the one of the one or more child screens is not associated with visual assets.

Example 14 may include the method of any of Examples 9-12, wherein the queuing includes associating, by the visual asset scheduler, one of the one or more child screens with a flag that indicates that the one of the one or more child screens has a child screen.

Example 15 may include the method of any of Examples 9-12, wherein the visual assets are associated with a smart watch that is in communication with the device.

Example 16 may include one or more computer-readable media comprising instructions to cause a device, upon execution of the instructions by one or more processors of the device, to: identify respective priorities of one or more child screens of a parent screen based on a screen priority binary tree associated with historical data related to the parent screen and the one or more child screens; queue the one or more child screens in an order related to the respective priorities of the one or more child screens; and cache visual assets related to the one or more child screens according to the order.

Example 17 may include the one or more computer-readable media of Example 16, wherein to identify respective priorities comprises to identify the priority of one of the one or more child screens is based at least in part on a likelihood that a user of the device will select the one of the one or more child screens from the parent screen.

Example 18 may include the one or more computer-readable media of Examples 16 or 17, wherein the instructions to cause the device to queue include instructions to cause the device to associate one of the one or more child screens with a flag that indicates that the one of the one or more child screens is not associated with visual assets.

Example 19 may include the one or more computer-readable media of Examples 16 or 17, wherein the instructions to cause the device to queue include instructions to cause the device to associate one of the one or more child screens with a flag that indicates that the one of the one or more child screens has a child screen.

Example 20 may include the one or more computer-readable media of Examples 16 or 17, wherein the visual assets are associated with a smart watch that is in communication with the device.

Example 21 may include a device comprising: means to identify respective priorities of one or more child screens of a parent screen based on a screen priority binary tree associated with historical data related to the parent screen and the one or more child screens; means to queue the one or more child screens in an order related to the respective priorities of the one or more child screens; and means to cache visual assets related to the one or more child screens according to the order.

Example 22 may include the device of Example 21, wherein the means to identify respective priorities include means to identify the priority of one of the one or more child screens based at least in part on a likelihood that a user of the device will select the one of the one or more child screens from the parent screen.

Example 23 may include the device of Examples 21 or 22, wherein the means to queue include means to cause the device to associate one of the one or more child screens with a flag that indicates that the one of the one or more child screens is not associated with visual assets.

Example 24 may include the device of Examples 21 or 22, wherein the means to queue include means to cause the device to associate one of the one or more child screens with a flag that indicates that the one of the one or more child screens has a child screen.

Example 25 may include the device of Examples 21 or 22, wherein the visual assets are associated with a smart watch that is in communication with the device.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A device comprising:
   a display screen; and
   a visual asset scheduler coupled with the display screen, wherein the visual asset scheduler includes:
   a screen predictor to identify respective priorities of one or more screens that are to be displayed on the display screen;
   a queue to queue the one or more screens in an order related to the respective priorities of the one or more screens; and
   a visual asset loader to load, based on the order and prior to display of the one or more screens, respective visual assets associated with the one or more screens, wherein a visual asset of the respective visual assets relates to a portion of a screen of the one or more screens that is less than an entirety of the screen.

2. The device of claim 1, wherein the screen predictor is to identify a priority of one of the one or more screens based at least in part on a likelihood that a user of the device will select the one of the one or more screens from a current screen that is displayed by the display screen.

3. The device of claim 2, wherein the screen predictor is to identify the likelihood based at least in part on historical data of the one or more screens.

4. The device of claim 2, wherein the current screen is a parent screen and the one or more screens are child screens of the parent screen.

5. The device of claim 1, wherein the screen predictor is to identify the respective priorities of the one or more screens based on a screen priority binary tree.

6. The device of claim 1, wherein the queue is to associate one of the one or more screens with a flag that indicates that the one of the one or more screens is not associated with assets.

7. The device of claim 1, wherein the queue is to associate one of the one or more screens with a flag that indicates that the one of the one or more screens has a child screen.

8. The device of claim 1, wherein the respective assets are associated with a smart watch that is in communication with the device.

9. A method comprising:
   identifying, by a visual asset scheduler of a device, respective priorities of one or more child screens of a parent screen;
   queuing, by the visual asset scheduler, the one or more child screens in an order related to the respective priorities of the one or more child screens; and
   caching, by the visual asset scheduler prior to display of the one or more child screens, visual assets related to the one or more child screens according to the order, wherein a visual asset of the visual assets relates to a portion of a screen of the one or more child screens that is less than an entirety of the screen.

10. The method of claim 9, further comprising identifying, by the visual asset scheduler, the respective priorities of the one or more child screens based on a screen priority binary tree.

11. The method of claim 9, wherein identifying comprises identifying a priority of one of the one or more child screens is based at least in part on a likelihood that a user of the device will select the one of the one or more child screens from the parent screen.

12. The method of claim 11, wherein the likelihood is determined based at least in part on historical data related to the one or more child screens.

13. The method of claim 9, wherein the queuing includes associating, by the visual asset scheduler, one of the one or more child screens with a flag that indicates that the one of the one or more child screens is not associated with visual assets.

14. The method of claim 9, wherein the queuing includes associating, by the visual asset scheduler, one of the one or more child screens with a flag that indicates that the one of the one or more child screens has a child screen.

15. The method of claim 9, wherein the visual assets are associated with a smart watch that is in communication with the device.

16. One or more non-transitory computer-readable media comprising instructions to cause a device, upon execution of the instructions by one or more processors of the device, to:
   identify respective priorities of one or more child screens of a parent screen based on a screen priority binary tree associated with historical data related to the parent screen and the one or more child screens;
   queue the one or more child screens in an order related to the respective priorities of the one or more child screens; and
   cache, prior to display of the one or more child screens, visual assets related to the one or more child screens according to the order, wherein a visual asset of the visual assets relates to a portion of a screen of the one or more child screens that is less than an entirety of the screen.

17. The one or more non-transitory computer-readable media of claim 16, wherein to identify respective priorities comprises to identify the priority of one of the one or more child screens is based at least in part on a likelihood that a user of the device will select the one of the one or more child screens from the parent screen.

18. The one or more non-transitory computer-readable media of claim 16, wherein the instructions to cause the device to queue include instructions to cause the device to associate one of the one or more child screens with a flag that indicates that the one of the one or more child screens is not associated with visual assets.

19. The one or more non-transitory computer-readable media of claim 16, wherein the instructions to cause the device to queue include instructions to cause the device to associate one of the one or more child screens with a flag that indicates that the one of the one or more child screens has a child screen.

20. The one or more non-transitory computer-readable media of claim 16, wherein the visual assets are associated with a smart watch that is in communication with the device.

* * * * *